United States Patent Office 3,467,587
Patented Sept. 16, 1969

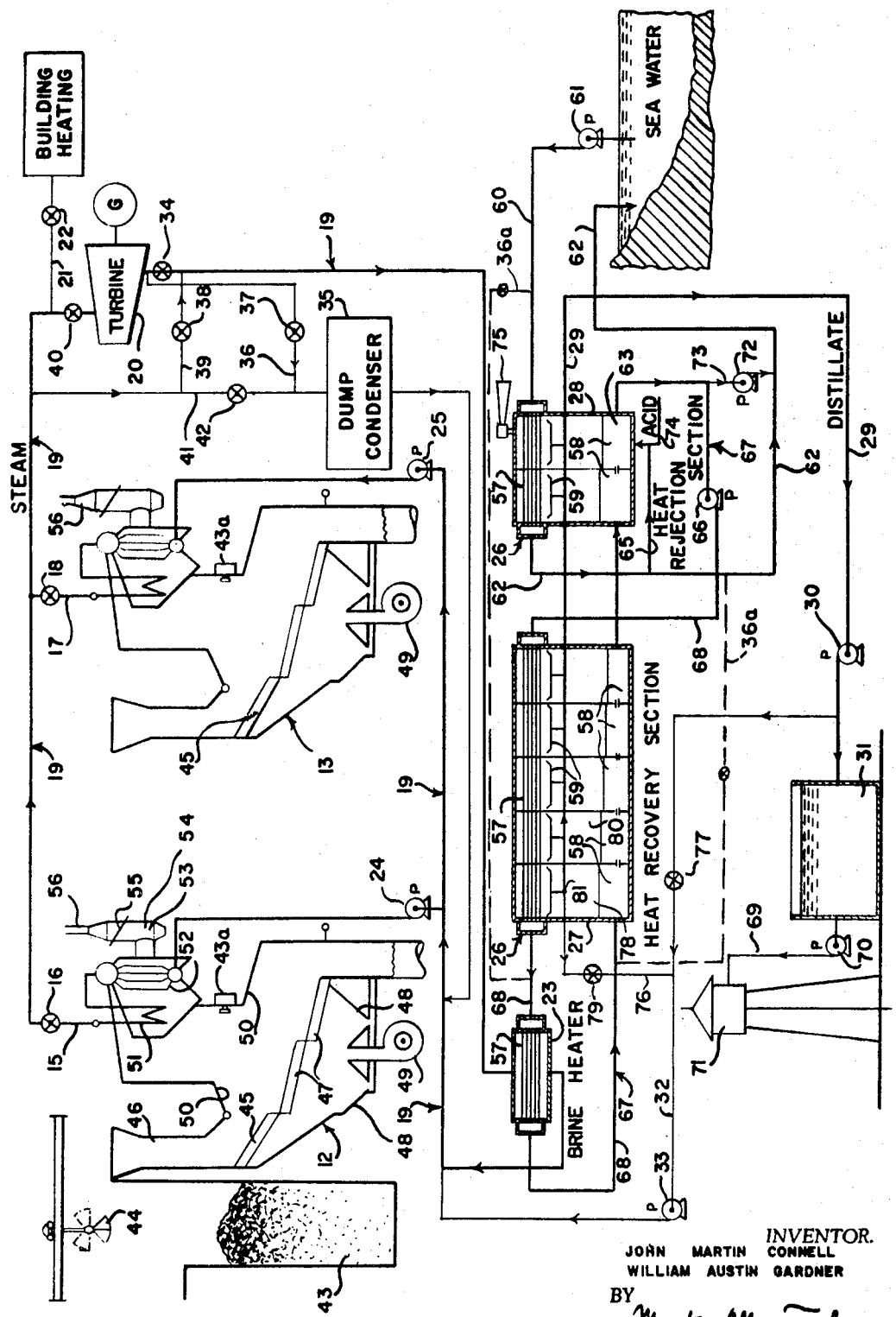

3,467,587
WASTE INCINERATOR STEAM GENERATOR-FLASH EVAPORATOR DESALINATION UNIT
John Martin Connell, Mountain Lake, and William Austin Gardner, Morristown, N.J., assignors to Foster Wheeler Corporation, New York, N.Y., a corporation of New York
Filed Jan. 5, 1966, Ser. No. 518,864
Int. Cl. C02b *1/06;* B01d *3/00;* F01k *25/00*
U.S. Cl. 202—173          1 Claim

ABSTRACT OF THE DISCLOSURE

A combined refuse disposal-water desalination unit for burning large quantities of waste refuse to obtain a heat source for operating a flash evaporator to obtain large quantities of potable water from sea water.

---

An important factor in the feasibility of a large desalination unit is the annual operating cost. Conventional fuel costs are substantial and it is generally believed that desalination plants must be built in capacities upward of 50 million gallons per day, in a plant that also generates many megawatts of electricity, if the cost of fresh water is to be reduced to a reasonable level. Usually such an installation contemplates nuclear energy as the fuel source which, in addition to special problems, raises the question of plant siting.

In large population centers, in addition to the need for supplementary sources of clean water, there is a requirement for better and more economical waste disposal. Present waste disposal methods leave much to be desired. The cost of collecting and hauling waste to remote city dumps is high and the labor is time consuming. The dumps often are a health menace and unsightly. They lower neighboring property values and are a poor use of potentially valuable land. Waste burial as another means of garbage dispsal has some of these disadvantages. In particular it is relatively costly and requires large burial grounds. On the other hand, incineration as a waste disposal method, has certain advantages. It reduces the waste refuse to about 25 percent of the original volume, burning all the putrescible materials. The residue is inert, does not support combustion or vermin and is an excellent fill for municipal and other uses, e.g., playgrounds, parking lots or airports. Incineration sites may be centrally located in large population districts, reducing the costs of hauling waste. However, the capital and operating costs of incineration are high, and air pollution considerations require additional expenses.

Another requirement of waste disposal incineration and desalination units is reliability. Reliability of operation in such plants is mandatory as the principal mechanical functions require continuous service. In particular, the incinerator facility should always operate to burn waste whether or not the desalination unit is in service; and the desalination unit and supporting equipment should be sufficiently reliable to produce the potable water needs of the community.

To partially offset the expense of incinerator operation, ancillary uses of the waste heat by-product have been made. In certain instances, steam has been generated for heating, or for generating electric power for the plant and nearby buildings. But the cost of the water tube boiler structure for generating the steam and the cost of fresh feed water for conversion to steam, is substantial, and the waste heat use has not been adequate to offset the cost of operating the plant.

In one incinerating plant of this type, at a location removed from fresh water, it was found desirable to use steam generated in the incinerator unit to desalinate small quantities of sea water for plant use, using a single stage, single effect submerged tube evaporator. Here the primary purpose for desalination was to produce fresh, plant feed water. With such an evaporator, desalination of large quantities of water was not economically feasible, keeping incineration costs high. Furthermore, it was not contemplated that large quantity desalination could considerably offset the costs of incineration as well as permit the waste refuse to serve as a reliable and readily available low cost heat source for the desalination. With refuse disposal and water supply the responsibilities of a single authority, such a combined purpose plant would be an ideal solution to the aforementioned requirements if a practical facility could be provided.

Therefore, it is an object of the present invention to provide a waste disposal incineration and desalination facility for consuming large quantities of waste refuse and for providing substantial quantities of fresh water.

It is an object of the present invention to provide an economical and reliable waste disposal incineration and desalination facility for consuming large quantities of waste refuse and for providing substantial quantities of fresh water.

It is another object of the present invention to provide a practical desalination plant which uses a low cost, readily available local fuel for power.

It is still another object of the present invention to provide an economical desalination plant without generating large quantities of electricity.

It is another object of the present invention to provide an economical incineration-desalination system having optimum heat recovery.

Accordingly, the present invention provides a combined incineration-desalination system utilizing a low cost and readily available local waste refuse as a fuel. The incinerator burns waste refuse and includes a boiler which generates steam therein. The desalination unit comprises a brine heater in which brackish water or sea water is heated by the steam from the boiler and a multistage flash evaporator in which the heated steam is flashed into vapor, the vapor then condensing as potable water. In another aspect of the invention, a portion of the potable water is withdrawn from the multistage flash evaporator at the hottest portion thereof supplying make-up feed water to the boiler, while the remainder of the potable water is withdrawn toward the cold end of the evaporator. As still another aspect of the invention, a bypass means is provided to assure continuous incinerator operation when the desalination unit is inoperative.

Such a system is inherently more reliable and efficient than prior units and is the first to produce large quantities of potable water, which exceed plant requirements, at low cost. It also provides for inexpensive waste disposal, the incinerating costs being offset by the potable water production. It provides a cheap, local and consequently available source of power to insure continuous operation of the unit. In the event local waste collection is temporarily curtailed there may be provided auxiliary oil burners to assure the continuous availability of steam for the desalination. For further reliability, all pumps may include a full capacity standby unit and three valves are provided at each station, any two capable of handling full load operation.

With the make-up water for the boiler being supplied exclusively from the hot stages of the multistage flash evaporator, further efficiencies in the unit are achieved making such a system a more practical and economical facility.

Other objects, aspects and advantages will become apparent from the following description of the present invention with reference to the drawing which is a schematic representation of a combined garbage disposal boiler desalination facility.

For purposes of description, operating conditions are specified, although it is understood that these are only by way of example. Hereinafter the term "dirty water" will be deemed to include brackish or sea water.

Referring now to the drawing for the incinerator-desalination unit of the present invention. Water cooled waste disposal units 12 and 13 consume waste each at the rate of 400 tons per day and produce steam from water in the boiler tubes at the combined rate of 240,000 pounds per hour at 275 p.s.i. and 470° F. The steam leaves waste disposal unit 12 through steam line 15 containing steam valve 16 therein and leaves waste disposal unit 13 through steam line 17 containing steam valve 18, both lines 15 and 16 feeding into the main flow line 19. The main flow line conducts the steam through heat utilization units (a turbine 20 and a desalination unit) returning steam condensate to the waste disposal units 12 and 13 for recycling.

A steam turbine-generator 20 is provided in the main flow line 19 leading from the waste disposal units for the production of all the required electricity to operate the plant. The steam piped to the turbine is expanded to about 40 p.s.i.a. therein, the turbine in effect acting as a pressure reducing valve. Upstream of the turbine, a portion of the steam is bled from the main flow line 19 through heating conduit 21 and valve 22 for building heating.

Downstream of the turbine in the main flow line 19 is a low pressure brine heater 23 receiving reduced pressure exhaust steam from the turbine for heating sea water flowing therethrough. The sea water leaving the brine heater exits at a maximum of about 250° F., this temperature selected to keep scale formation on the inside of the sea water tubing to a minimum, thereby avoiding the otherwise necessary injection of excessive quantities of acid into the sea water to reduce scale formation. The steam in line 19 passes over the sea water tubes in the brine heater and condenses as the latent heat of evaporation of the steam heats the water. To maintain the sea water exit temperature at 250° F., the saturated steam temperature entering the heater is fixed somewhat above 250° F. In this example, the steam enters the heater at a saturated temperature of approximately 270° F. which corresponds to a pressure of 40 p.s.i.a. The turbine acting as a pressure reducing valve and the piping between the turbine and heater reduce the steam pressure to 40 pounds at the brine heater to meet this condition.

Condensate from the brine heater is then recirculated in line 19 back to the waste disposal units via feedwater pumps 24 and 25 for recycling through the incinerator-boiler system. The sea water heated in the brine heater is flashed into fresh water vapor in a five million gallon per day flash evaporator 26 comprising a heat recovery section 27 and a heat rejection section 28, and is withdrawn therefrom as fresh water via distillate line 29 through the cold end of the evaporator toward the heat rejection section by distillate pump 30 and stored in fresh water supply 31. As hereinafter described, a portion of the fresh water produced in the heat recovery section 27 is pumped directly from the hottest portion of the distillate line 29 into the main flow line 19 downstream of the brine heater to the waste disposal units via makeup water line 32 and makeup pump 33.

In the event the brine heater, or any component part of the flash evaporator is inoperative, brine heater isolation valve 34 in the main flow line upstream of the heater is closed and steam is bypassed from the outlet of the turbine to a dump condenser 35 via heater bypass line 36 through a dump condenser valve 37, bypassing the brine heater. The incinerator plant then draws its makeup water from the fresh water supply 31 through makeup water line 32, and the incinerator plant can still burn waste refuse at full capacity.

When the turbine 20 or connecting generator is out of operation, pressure reducing valve 38 in turbine bypass line 39 (across the turbine and heater valve) directs steam from the main steam line, at a point upstream of the turbine, to the brine heater so that the flash evaporator remains in operation. For this purpose, a turbine valve 40 provided in the main flow line 19 at the turbine inlet, is closed. During such periods, electricity for the plant is furnished by an auxiliary diesel-electric generator (not shown). Where both the turbine 20 and the flash evaporator or brine heater are inoperative, the steam bypasses both the turbine and brine heater through bypass line 41 and bypass valve 42 directing steam to the dump condenser 35; valves 40 and 38 are closed during such periods. As an alternative to dump condenser 35 (and its supporting circuitry) when the evaporator 26 is inoperative the sea water could be bypassed, by suitable bypass lines (lines 36a) around the evaporator 26, the sea water then passing directly through the tubes of the brine heater condensing the boiler steam.

Each refuse disposal unit burns waste refuse as the normal fuel, but oil burners 43a will supply heat during such times as rubbish collection or feeding are interrupted. In the following description of the waste disposal units reference is made only to waste disposal unit 12 although it is to be understood that both units function similarly. Refuse is deposited from trucks which collect waste from local areas into dumps 43 (the same dump may be used for both units) from which it is lifted by a clam shell bucket 44 and dropped onto fedeing rams 45 through the charging hopper 46. The feeding rams feed the waste into the water cooled incinerator furnaces onto the burning sections of a reciprocating grate stoker or agitator 47 (other grate stokers, e.g., traveling, vibrating or rocking grate stokers may also be used with this invention). Here the waste is tumbled and agitated to assure complete burnout before final discharge as inert residue into the ash hopper 48. Air blown under and through the grate tuyeres (not shown) from forced draft blower 49 provides the oxygen necessary for complete combustion of the refuse and assures odor destruction within the furnace. The gases formed are thoroughly mixed under the furnace arches 50 before they are directed across the heat absorbing surfaces of the superheater 51 and boiler 52. These gases are further cooled in passing over the economizer surface 53 wherein the heat is absorbed by the incoming boiler feed water.

The furnaces include completely water cooled walls and arches of monowall construction, with finned tubes welded to each other to form a monolithic metallic enclosure (not shown). This construction precludes any possibility of ash buildup on the walls, reduces air infiltration and eliminates the need for the periodic furnace relining commonly associated with refractory furnaces. The heat absorbed by the water and steam in the absorbing surfaces (superheater, boiler and economizer) reduce the gas temperature to 450° F., the maximum stack temperature, at the precipitator entrance 54, without necessitating the introduction of large quantities of air into the furnace which would otherwise be necessary to reduce the gas temperature.

Large particles of fly ash are caught in the boiler hoppers 48, but the insidious fine dust, which tends to permeate and pollute the atmosphere is removed within the electrostatic precipitator 55 before leaving the stack 56.

The reduced volumes of gases, resulting from the low excess air in the furnace and the low temperature leaving the economizer require a smaller and less expensive precipitator than has heretofore been considered necessary on incinerator applications. The reduced gas volume makes this device commercially feasible for an incinerating facility.

The multistage flash evaporator 26 converts sea water into fresh water by causing the sea water to absorb heat while flowing within tubes 57 in the flash evaporator sections (27 and 28) and in the brine heater 23 and then allowing some of the heated sea water to flash into steam in the flash evaporator sections from compartmental pools 58 therein, beneath the tubes, while under a vacuum. Minute salt particles remain within the pool, while the rising steam condenses adjacent the relatively colder tubes and rains down pure drinking water into collecting trays 59 between the tubes and the pools. In practice the flash evaporator 26, comprising sections 27 and 28, and the brine heater 23 are part of a single unit although the drawing schematically depicts them as separate units.

Sea water is pumped through sea water intake line 60 by sea water pump 61 through the tube bundles 57 of the stages or compartments of the heat rejection section 28 to absorb heat (while condensing flashed vapor from the pools 58) returning most of the heated sea water to the sea through sea discharge line 62. The remainder of the sea water which has been heated in the tubes of the heat rejection section stages is piped into sump 63 of the first heat rejection stage via line 65 connecting the sump with the sea water discharge line 62. Recirculation pump 66 located in desalination recycle circuit 67 between the sump and the tubes 57 of the heat recovery section 27 draws sea water from the sump 63 forcing it through all the tubes 57 in the stages of the heat recovery section 27; the tubes 57 of the brine heater 23; all the pools 58 in all the flash evaporator stages; and the conduits 68 connected therebetween, all comprising recycle circuit 67. The sea water gains additional heat while passing through the tube bundles 57 in the heat recovery section 27 and then flows through the tubes 57 of the brine heater to absorb the latent heat of the steam coming from the main flow line 19 passing around the tubes; the sea water is heated in the brine heater 23 under sufficient pressure to prevent the sea water from boiling. The hot sea water now cascades through the pools 58 of each stage of the flash evaporator flowing serially through each compartment countercurrent to the tube flow; the compartments, in the direction of pool flow, are maintained at successively lower pressures. In each compartment great volumes of steam are flashed and pass from the pool surface, to condense on that portion of the tube bundle 57 in the compartment, leaving the salts behind in the pools to pass from pool to pool. The condensed steam forms droplets that agglomerate on the outer surfaces of the tubes and rain into the distillate collecting trays 59 for removal as pure drinking water from the evaporator through distillate water line 29 by pump 30 into the fresh water supply 31 from which the water is piped through line 69 by pump 70 to municipal water tower 71 for distribution. The flashing of part of the sea water in the pools causes an increase in salt concentration within the remaining brine. A blowndown pump 72 in blowdown line 73 just downstream of the sump 63 of the first stage of the flash evaporator constantly removes a quantity of this brine and discharges it into the sea via the sea water discharge line 62 at a point on line 62 downstream of line 65.

Acid is injected into line 65 to the sump 63 from acid supply 74 in quantities sufficient to prevent scale buildup within the desalination tubing. The heat rejection section 28 and the recycle loop 67 keeps much of the acid treated seat water within the system, reducing the total quantities of chemicals required. Where acid conservation is not a requirement, the heat rejection section 28 and the acid recycle circuit may be eliminated. Sea water flow would then be in series through the flash evaporator tubes, the brine heater tubes, the pool stages (in a direction countercurrent to the tube flow) and then to the sea, in that order. Dissolved gases and the gases produced within the cycle are removed by an air ejector system, indicated at 75 to prevent blanketing of heating surfaces and a reduction of capacity. Copper nickel tubing, clad tube sheets and epoxy coated surfaces are used to prevent salt water corrosion.

During operation of the flash evaporator, the makeup water for the boiler is drawn directly from the distillate trays 59 and line 29 via line 76 feeding into makeup water line 32 and through pump 33 into the main flow line 19. At this time valve 77 between the fresh water supply 31 and line 76 is closed. Line 76 is shown connected to the distillate removal line 29 in the hottest stage 78 of the heat recovery section 27 adjacent the brine heater. Here the distilled water in the tray of stage 78 is hotter than at any other stage in the evaporator.

Control valve 79 in line 76 controls the amount of fresh water drawn from the distillate trays 59 to the boilers according to boiler feed water requirements. Where greater quantities of fresh feed water are required, valve 79 opens wider drawing water first from stage 78, and as it opens further, then from the next hottest stage 80 via the portion of line 29 between the tray of stage 80 and the hot end of the evaporator at stage 78. If further water is required, valve 79 opens still further drawing distillate from succeeding cooler stages down the line via distillate line 29.

In this manner, it is seen that the connection of line 76 to line 29 at a position 81 in the hottest stages provides the hottest makeup water for the boiler thereby providing optimum heat conservation and operating efficiency. The removal of hot distillate water from the stages through both line 76 to the boiler and through line 29 to the fresh water supply 31 in addition offers rapid heat removal from the flash evaporator and more efficient flashing.

Although line 76 is shown connected to the hottest portion of line 29, at connection point 81, it may be connected at other positions. For example it may be connected directly to the hottest trays. Line 29 may also be connected at a point on the line 29, no further from the hot end than at a point where total distillate produced between said connection point and the hot end provides the minimum makeup water requirements of the boilers. In this manner, at minimum boiler requirements, all the distillate produced between the connection point and the hot end stage 78 is sufficient to meet the minimum feed water demands and only the hottest distilled fluid is sent to the boiler; if the connection 71 were located in a colder stage this would not be so. With connection 81 at the end point on line 29 this feature is automatically achieved as the makeup requirements draw distillate only from the hottest distillate available.

The following table demonstrates the economical advantages of the large combined incineration-desalination unit described herein:

REFUSE DISPOSAL-OPERATING COSTS

[Two 400-ton/day waste disposal units complete ($9,700,000 total incineration-desalination plant cost apportioned as to function), $4,200,000]

|  | Per year |
|---|---|
| Fixed charges (4%, 25 years) | $270,000 |
| Operating labor (34 men plus plant supt.) | 235,000 |
| Maintenance (2% of initial costs) | 84,000 |
| Electrical power (½ capital cost, amortized) | 12,800 |
| Total operating budget | 601,800 |

Operating cost $= \dfrac{\$601,800}{(800 \text{ tons/day})(350 \text{ days/yr.})} = \$2.24/$ ton

POTABLE WATER PRODUCTION-OPERATING COSTS

[Desalination plant installed ($9,700,000 cost apportioned as to function), $5,500,000]

|  | Per year |
|---|---|
| Fixed charges (4%, 25 years conservative estimate of amortization) | $353,000 |
| Operating labor (4 men) | 91,000 |
| Maintenance | 106,000 |
| Fuel (refuse fuel $0 plus 15-day oil firing) | 35,400 |
| Electric power (½ capital cost, amortized) | 13,800 |
| Total operating budget | 598,200 |

$$\text{Fresh water cost} = \frac{(\$598,200)(1,000)}{(5,000,000 \text{ gal./day})(350 \text{ days})}$$

$$= \$.342/1,000 \text{ gal.}$$

If all required heat for this plant were supplied by burning fuel oil, without any refuse burning, then the annual fuel cost would be $828,000, increasing the operating budget to $1,388,000. The fresh water cost, therefore, would become:

$$\frac{(\$1,388,000)(1,000)}{(5,000,000 \text{ gal./day})(350 \text{ days})} = \$.792/1,000 \text{ gal.}$$

The above figures show that with the plant of the invention large capacity economical units can be achieved.

Although the present invention has been described with respect to a particular system, various changes and modifications may be made by those skilled in the art to which this invention pertains within the scope of the invention as in the appended claim.

What is claimed is:

1. A waste disposal-desalination unit for burning waste refuse and desalinating impure water comprising:
    a water cooled incinerator for burning waste refuse and for generating steam;
    a main flow line connected to the incinerator for conducting steam from the incinerator and for returning water to the incinerator;
    a steam turbine-generator in the main flow line for reducing the pressure of the steam;
    a brine heat exchanger having a steam flow path in the main flow line downstream of the turbine, the heat exchanger also having a brine flow path independent of the steam flow path for heating the impure water in the brine flow path in indirect heat exchange and for condensing the steam in the steam flow path, the brine flow path being maintained at sufficient pressure to prevent the impure water from boiling;
    a heat exchanger bypass line connected to the main flow line around the brine heat exchanger, a dump condenser disposed in the heat exchanger bypass line, a dump condenser valve in the heat exchanger bypass line upstream of the dump condenser, and a heat exchanger valve disposed in the main flow line upstream of the brine heat exchanger between the brine heat exchanger and the heat exchanger bypass line;
    a turbine-heater bypass conduit connected from the main flow line upstream of the turbine to the dump condenser, a valve disposed in said conduit and a turbine entrance valve in the main flow line upstream of the turbine between the turbine and the conduit;
    a multistage flash evaporator including a heat rejection section and a heat recovery section, each section defining a plurality of compartments including a hot end compartment, a plurality of tubes extending through each compartment and a plurality of brine pools disposed in said compartments in flow series beneath said tubes, both the tubes and pools connected in flow communication through said brine flow path from the hot end compartment, the flow through the pools being in a direction countercurrent to the flow through the tubes, said compartments maintained at successively reduced pressures in order of pool flow for flashing the impure water in the pools and for condensing the flashed water adjacent the tubes, said hot end compartment being in the heat recovery section;
    means for conducting the impure water into the tubes of a first compartment of the heat rejection section;
    conduit means connected between the tubes of the heat rejection section and the pool of the first compartment for passing a portion of the returning water from the tubes of the heat rejection section into the pool of the first compartment;
    recycle circuit means for passing the returning water in the pool of the first compartment serially through the tubes of the heat recovery section, through the brine flow path of the brine heat exchanger, through the pools of the heat recovery section and through the pools of the heat rejection section to the first compartment, in that order;
    blowdown means connected to the recycle circuit means adjacent said first compartment for discharging a portion of the impure water from the unit; and
    means including a distillate tray in each compartment for collecting condensed flashed water therein, a distillate line connected to each tray and extending from the flash evaporator, and a distillate pump in said distillate line outside the flash evaporator for removing the condensed flashed water through the distillate line.

References Cited

UNITED STATES PATENTS

| | | |
|---|---|---|
| 2,064,953 | 12/1936 | Serpas. |
| 2,151,079 | 3/1939 | Bowen. |
| 2,759,882 | 8/1956 | Worthen et al. _____ 203—11 |
| 3,026,261 | 3/1962 | Mayfield et al. _____ 159—47 X |
| 3,119,752 | 1/1964 | Checkovich _____ 203—10 X |
| 3,147,072 | 9/1964 | Thomsen _____ 203—11 X |

OTHER REFERENCES

International Symposium on Water Desalination, October 3–9 (1965), see drawing "Appendix A" Dual-Purpose Plant in Eilat, Israel.

NORMAN YUDKOFF, Primary Examiner

F. E. DRUMMOND, Assistant Examiner

U.S. Cl. X.R.

60—64; 203—11, 100